A. H. HAEFELE.
ELECTRODE TERMINAL.
APPLICATION FILED MAR. 31, 1915.
1,377,127.
Patented May 3, 1921.
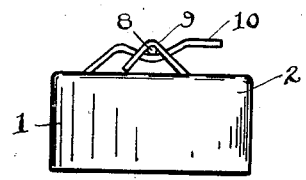
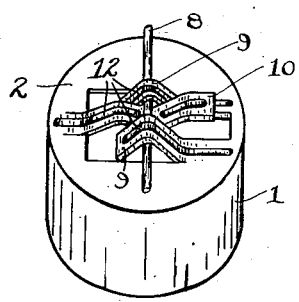 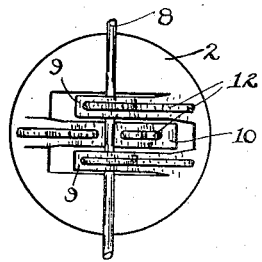
WITNESS
INVENTOR.
ALBERT. H. HAEFELE
BY
ATTORNEY

UNITED STATES PATENT OFFICE.

ALBERT H. HAEFELE, OF LAKEWOOD, OHIO, ASSIGNOR, BY MESNE ASSIGNMENTS, TO NATIONAL CARBON COMPANY, INC., A CORPORATION OF NEW YORK.

ELECTRODE-TERMINAL.

1,377,127.    Specification of Letters Patent.    Patented May 3, 1921.

Original application filed January 23, 1914, Serial No. 813,928. Divided and this application filed March 31, 1915. Serial No. 18,273.

*To all whom it may concern:*

Be it known that I, ALBERT H. HAEFELE, a citizen of the United States, residing at Lakewood, in the county of Cuyahoga and State of Ohio, have invented a certain new and useful Improvement in Electrode-Terminals, of which the following is a full, clear, and exact description.

This application, which is a division of my application Serial No. 813,928, filed January 23, 1914, relates to a battery connector and is particularly adapted for carbon electrodes of dry cells.

It has formerly been the practice to solder, rivet or otherwise fasten a spring clip to the metal cap of a dry cell carbon. The clip and cap are therefore necessarily formed by distinct operations and additional time and labor are required to secure the two together. The voltage of a dry cell is not high and it is important to secure a good electrical connection between the clip and the cap so that there will be no voltage drop in the joint. If the clip is secured to the cap by rivets or screws a high resistance connection frequently results. Even though the connection is in good condition when the cell leaves the factory, the clip is liable to work loose when put in use which causes a useless waste of energy as well as a low terminal voltage of the cell. Soldered connections are liable to loosen on account of corrosion or electrolytic action and in addition are liable to be knocked off by rough handling. It is the object of my invention to overcome these disadvantages.

In the drawings:—

Figure 1 is a side view of the terminal.

Fig. 2 is a perspective view.

Fig. 3 is a top view.

In the drawings the cap, which is adapted to be applied to a carbon electrode of a dry cell, consists of a cylindrical side or skirt portion 1 and a top portion 2.

In my form of electrode terminal the clip is drawn or struck up from the top of the cap itself so that no rivets or solder is necessary. The cap is preferably drawn from spring brass of appropriate thickness and the connector can be made at the same time or afterward.

The outside hooks or arms 9 are struck from the cap preferably to extend in the same direction as shown. The movable tongue or pressure member 10 is preferably struck in such a way as to have its free end extending in a direction opposite to that of the arms 9.

To give rigidity furrows or ridges 12 are made in any or all of the three members as shown. This also tends to contract them so that sufficient clearance will be had to permit free movement of the movable member.

The cap after having been formed and stamped with the connector will be driven over a carbon electrode of a dry cell and no further work on the terminal is necessary. To make a connection the tongue 10 is depressed and a conductor 8 is inserted as shown in Figs. 2 and 3. On releasing the tongue the conductor is firmly held in place.

The improved form of cap for dry cell carbons has no contact drop in the connection between clip and cap, is more easily made and cannot be jarred loose by rough handling. Such a connection has a distinct advantage over the old type.

Having described my invention, what I claim is:—

1. A battery terminal consisting of a cap having a top and a depending skirt portion, a resilient tongue member struck up from the top and having a wire engaging depression, and two hook-shaped members struck from said top one on each side of said tongue, said hook-shaped members each being integral with the top at one side only and adapted to coöperate with the depression in said resilient tongue to engage a conductor when the tongue is depressed.

2. A battery terminal consisting of a cap having a top and a depending skirt portion, a resilient tongue member cut out of the top integral at one end only and having a wire engaging depression, and two hook-shaped members struck up from said top integral at one end only, said members being located one on each side of said tongue, the integral ends of said hook-shaped members being opposite to the integral end of the tongue members.

3. A terminal comprising a top, a flange projecting at an angle from one side of said top, a spring tongue attached to and extending across the other side of said top, and hook-shape wire-receiving means attached to and projecting above such other side of said top and arranged adjacent to and coöperating with said tongue to hold a conductor therebetween.

4. A one-piece battery terminal cap comprising a top, a circular flange depending therefrom, a spring tongue struck up from and extending across the upper side of said top, and a pair of hook-shape spring wire-engaging members struck up from said upper side of said top, said members being disposed on opposite sides of said tongue and adapted to coöperate therewith to hold a conductor therebetween, such top, flange and members being formed from a single piece of metal and integrally connected together.

In testimony whereof, I hereunto affix my signature.

ALBERT H. HAEFELE.